United States Patent
Feustel et al.

(10) Patent No.: US 12,060,480 B2
(45) Date of Patent: Aug. 13, 2024

(54) POLYMER COMPOSITIONS AND USE THEREOF AS POUR POINT DEPRESSANTS IN PARAFFIN-CONTAINING HYDROCARBON OILS

(71) Applicant: Clariant International Ltd., Muttenz (CH)

(72) Inventors: Michael Feustel, Köngernheim (DE); Mike Saul, Bad Camberg (DE); Matthias Krull, Harxheim (DE)

(73) Assignee: Clariant International Ltd, Muttenz (CH)

( * ) Notice: Subject to any disclaimer, the term of this patent is extended or adjusted under 35 U.S.C. 154(b) by 115 days.

(21) Appl. No.: 17/764,111

(22) PCT Filed: Aug. 31, 2020

(86) PCT No.: PCT/EP2020/074179
§ 371 (c)(1),
(2) Date: Mar. 25, 2022

(87) PCT Pub. No.: WO2021/058228
PCT Pub. Date: Apr. 1, 2021

(65) Prior Publication Data
US 2022/0380590 A1 Dec. 1, 2022

(30) Foreign Application Priority Data
Sep. 26, 2019 (EP) .................... 19199724

(51) Int. Cl.
*C08L 33/08* (2006.01)
*C10L 1/196* (2006.01)
*C10L 10/16* (2006.01)

(52) U.S. Cl.
CPC ........... *C08L 33/08* (2013.01); *C10L 1/1963* (2013.01); *C10L 10/16* (2013.01); *C10L 2200/0453* (2013.01); *C10L 2230/14* (2013.01)

(58) Field of Classification Search
CPC ...... C08L 23/0853; C08L 33/08; C08L 33/26; C10L 1/146; C10L 1/1641; C10L 1/1963; C10L 1/2364; C10L 10/16; C10L 2200/0438; C10L 2200/0453; C10L 2230/14
See application file for complete search history.

(56) References Cited

U.S. PATENT DOCUMENTS

| | | |
|---|---|---|
| 4,608,411 A | 8/1986 | Meunier |
| 2005/0126070 A1 | 6/2005 | Krull |
| 2012/0174474 A1* | 7/2012 | Sondjaja ............... C10L 10/14 44/395 |
| 2019/0002779 A1* | 1/2019 | Feustel ................ C08L 33/08 |

FOREIGN PATENT DOCUMENTS

| | | |
|---|---|---|
| EP | 0271738 | 6/1988 |
| EP | 0376138 A2 | 7/1990 |
| EP | 0384367 | 8/1990 |
| EP | 0376138 A3 | 10/1990 |
| EP | 0486836 | 5/1992 |
| EP | 1808450 | 7/2007 |
| EP | 2305753 A1 | 4/2011 |
| WO | 2005023907 | 3/2005 |
| WO | 2011035947 | 3/2011 |
| WO | 2014095412 | 6/2014 |
| WO | 2017108361 | 6/2017 |
| WO | WO-2017108361 A1 * | 6/2017 ............ C08F 220/18 |

OTHER PUBLICATIONS

International Search Report issued in App. No. PCT/EP2020/074179, Nov. 10, 2020, 4 pages.

* cited by examiner

Primary Examiner — Latosha Hines

(57) ABSTRACT

The invention relates to polymer compositions with improved manageability. The invention also relates to a polymer composition obtainable by radical polymerisation of A) 95-40 wt. % of a monomer mixture comprising Ai) 65-98 wt. % of at least alkyl (meth)acrylate having a linear $C_{16}$-$C_{40}$ alkyl radical and Aii) 2-35 wt. % of at least one comonomer selected from (meth)acrylates and (meth)acrylamides, which supports an optionally substituted aromatic radical bonded via an alkylene, alkenylene, oxyalkylene or polyoxyalkylene group to the ester group of the (meth)acrylate or to the amide group of the (meth)acrylamide, in the presence of B) 5-60% by weight % of at least one ethylene copolymer. The invention further relates to a method for the preparation and use thereof as flow improvers for paraffin-containing hydrocarbon oils.

28 Claims, No Drawings

POLYMER COMPOSITIONS AND USE THEREOF AS POUR POINT DEPRESSANTS IN PARAFFIN-CONTAINING HYDROCARBON OILS

The present invention provides polymer compositions composed of copolymers of alkyl (meth)acrylates, methacrylates bearing an aromatic group, and ethylene copolymers, and for the use thereof for improving the cold properties of paraffinic hydrocarbon oils.

Crude oils, and also the products produced therefrom, such as bunker oils, heavy heating oils and distillation residues, are complex mixtures of different kinds of substances, for example saturated and unsaturated hydrocarbons, aromatics, resins and asphaltenes. When the oils are cooled, for example, during production, transport, storage and/or further processing, various substances present in the crude oil can present problems. Long-chain n-paraffins in particular can precipitate out when the temperature goes below an oil-specific temperature and form a three-dimensional network of flakes and/or fine needles in which relatively large amounts of liquid constituents are intercalated and retained. Even though the majority of the oil is still liquid, the oil loses flowability as a result, which can result, for example, in cessation of pipeline transport and trapping of considerable amounts of oil in storage tanks between the paraffins that crystallize out particularly at the tank walls. This problem relates not only to crude oils but also to the heavier products produced therefrom, for example heavy heating oil, marine diesel, bunker oil and residue oils, which contain relatively large amounts of n-paraffins.

Therefore, additives intended to improve the flowability of the oil at low temperatures are added in many cases to paraffinic mineral oils for transport and storage. Predominantly, these "paraffin inhibitors" are oil-soluble, synthetic polymeric compounds. These modify the crystal structure of the paraffins precipitated out on cooling and prevent the formation of a three-dimensional network of paraffin crystals. To some degree, the additives also promote the formation of fine, well-crystallized and non-agglomerating paraffin crystals. Since such additives will lower the pour point (no-flow point) of the oil, they are also referred to as pour point depressants (PPDs). The pour point refers to the lowest temperature at which a sample of an oil still just flows as it is cooled. The no-flow point of oils can be determined, for example, by means of DIN ISO 3016 and ASTM D97.

Active ingredients frequently used for paraffin inhibition are copolymers of ethylene and poly(alkyl (meth)acrylates), which respectively have different mechanisms of action. In the case of the ethylene copolymers, cocrystallization with paraffins is effected via the poly(ethylene) sequences of the main chain, the average length of which can be controlled via the comonomer content of the polymer. Preferred ethylene copolymers here are copolymers of ethylene with vinyl esters and especially with vinyl acetate. In the case of the poly(alkyl (meth)acrylates), by contrast, the length of their side chains is essential, which has to be appropriate for the average chain length and hence for the crystallization characteristics of the n-alkanes in the oil to be additized. Particularly effective here are linear alkyl radicals having 18 or more carbon atoms.

It is often the case that the paraffin-inhibiting action of poly(alkyl (meth)acrylates) can be increased by copolymerization with comonomers bearing functional groups. For this purpose, EP 0376138 proposes the copolymerization of 50% to 99.9% by weight of a $C_{14}$-$C_{22}$-alkyl (meth)acrylate with 50% to 0.1% by weight of a further comonomer. A comonomer detailed by way of example is benzyl acrylate.

Also suggested for increasing the paraffin-inhibiting action were mixtures of ethylene polymers with poly(alkyl (meth)acrylates). In the handling of such additive concentrates that are produced by mixing the polymers, a phase separation resulting from polymer incompatibility often occurs, and so reproducible paraffin inhibition is not possible with such additives.

For solution of the problem of phase separation, it has been suggested that the polymerization of the alkyl (meth) acrylate be performed in solution and in the presence of the ethylene copolymer. According to commonly accepted theory, at least a portion of the alkyl (meth)acrylate monomers here is grafted onto the ethylene copolymer, while a further portion polymerizes without grafting and hence forms an alkyl (meth)acrylate homopolymer. Subsequently, the at least partial grafting prevents the polymers from separating in the additive concentrate and hence enables the treatment of the oil with an additive always of the same composition.

U.S. Pat. No. 4,608,411 discloses graft polymers of poly (alkyl acrylates) onto ethylene copolymers. The alkyl acrylates used for grafting derive from alcohol mixtures including at least 20% by weight of alkyl radicals having 22 or more carbon atoms and a proportion of $C_{12}$-$C_{16}$ alcohols of less than 10% by weight.

EP 0384367 discloses mixtures of high and low molecular weight graft polymers of alkyl (meth)acrylates inter alia onto ethylene-vinyl ester copolymers as PPDs for fuel oils. For preparation of the alkyl acrylate used for grafting, by way of example, an alcohol mixture of 20% by weight of $C_{16}$, 40% by weight of $C_{18}$, 10% by weight of $C_{20}$ and 30% by weight of $C_{22}$ alcohols is used.

EP 0486836 A1 discloses mineral oil middle distillates, for example gas oils, diesel oils or heating oils, which, for improvement of flow properties under cold conditions, contain customary ethylene-based flow improvers, for example copolymers of ethylene and vinyl acetate, vinyl propionate or ethylhexyl acrylate and copolymers of linear or branched $C_8$- to $C_{18}$-alkyl (meth)acrylates and linear or branched $C_{18}$- to $C_{28}$-alkyl vinyl ethers in a weight ratio of 40:60 to 95:5. The copolymers of alkyl (meth)acrylates and alkyl vinyl ethers and the conventional flow improvers may take the form of a mixture, or the copolymers of the alkyl (meth) acrylates and/or alkyl vinyl ethers may be wholly or partly grafted onto the ethylene-based flow improvers.

WO 2005/023907 discloses pour point depressants for crude oil, comprising at least two polymers selected from i) ethylene copolymers, ii) n-alkyl (meth)acrylate-grafted ethylene copolymers and iii) (co)polymers of n-alkyl (meth) acrylates. The alkyl (meth)acrylates in component ii) and also iii) have 6 to 40 and preferably 14 to 30 carbon atoms in the alkyl radical, and may contain up to 50% of one or more comonomers, for example α-olefins, vinyl esters or vinylpyridine. In order to overcome polymer incompatibilities, these mixtures are formulated as dispersions in water.

EP 1808450 A discloses alkyl acrylate-grafted copolymers of ethylene, vinyl acetate and a further vinyl ester, and the use thereof for improving the cold flow properties of fuel oils. Preferred grafts are esters of acrylic acid with n- or iso-$_8$-$C_{22}$-alcohols.

WO 2011/035947 discloses compositions comprising a poly(alkyl (meth)acrylate) having a number-average molecular weight Mn of 1000 to 10 000 g/mol and an ethylene-vinyl acetate copolymer containing structural units derived from a $C_1$-$C_{30}$-alkyl (meth)acrylate. The poly(alkyl (meth)acrylates) contain at least 10% by weight and especially 70% to 99% by weight of one or more alkyl (meth)acrylates having 7 to 15 carbon atoms in the alkyl radical and a maximum of 40% by weight of alkyl (meth)acrylates having 16-40 carbon atoms in the alkyl radical. They may optionally contain up to 60% by weight of various further comonomers, with restriction of the proportion of comonomers having (hetero)aromatic groups, for example of benzyl (meth)acrylate, and also monomers bearing heteroatoms, to 1% by weight or lower for environmental reasons. These compositions are used as flow improvers in fuel oils and especially in biodiesel. Detailed by way of example are EVA copolymers grafted with $C_{12}/C_{15}$-alkyl methacrylate and with $C_6$-$C_{18}$-alkyl methacrylate.

The paraffin inhibitors produced by graft polymerization according to the prior art are typically used as a formulation in organic, predominantly aromatic solvents. On account of the paraffinic structural elements required for their efficacy and typically also high molecular weights, concentrated solutions of these polymers have intrinsic pour points that are often above the ambient temperatures that exist when they are used. It is problematic that the concentrates often have inadequate flowability even at temperatures below 25° C. This becomes particularly problematic usually at temperatures below 20° C. and particularly below 15° C. and especially below 10° C. Such low temperatures often occur in the case of storage in unheated storage tanks as frequently encountered in isolated production areas or else in terminals, and also when the additives are used in deep sea production. For uninterrupted use at low temperatures, consequently, significant dilution of the additives and/or heating of the production conduits are required. Since both lead to unwanted extra cost and inconvenience, suggestions have been made to lower the intrinsic pour point of paraffin inhibitors.

WO 2014/095412 discloses polymeric compositions obtainable by free-radical polymerization of alkyl (meth)acrylates in the presence of at least one ethylene-vinyl ester copolymer. The alkyl (meth)acrylates used are a mixture of (A1a) 50-99 mol % of at least one alkyl (meth)acrylate with a linear $C_{12}$-$C_{60}$-alkyl radical and (A1b) 1 to 49 mol % of at least one alkyl (meth)acrylate with a linear $C_1$-$C_{11}$-alkyl radical, a branched $C_4$-$C_{60}$-alkyl radical and/or a cyclic $C_5$-$C_{20}$-alkyl radical. These compositions are fluid and stable as 48% dilutions in toluene at room temperature. They are used as pour point depressants in crude oils, mineral oils and mineral oil products. It is optionally possible for the polymers to contain further monomers A2 that do not meet the definition of the monomers A1a and A1b. Also mentioned in the list of optional monomers are (meth)acrylates having phenyl, 4-methylphenyl, benzyl and 2-phenylethyl radicals.

WO 2017/108361 discloses polymer compositions obtainable by free-radical polymerization of an alkyl (meth)acrylate having 16 to 40 carbon atoms in the alcohol radical and a (meth)acrylic ester of a $C_8$-$C_{22}$ alcohol bearing a $C_6$-$C_{20}$-alkyl radical in the 2 position to the hydroxyl group in the presence of an ethylene copolymer. They are used as pour point depressants in crude oils, mineral oils and mineral oil products. It is optionally possible for the alkyl (meth)acrylates to contain up to 40% by weight of further monomers. The list of optional comonomers also includes benzyl acrylate.

According to WO 2014/095412 and also WO 2017/108361, the flow properties of the paraffin inhibitors at low temperatures are improved by the incorporation of (meth)acrylic esters of short-chain and/or branched fatty alcohols.

However, it has been found that the ability of such paraffin inhibitors having short-chain and/or branched alkyl radicals to cocrystallize with the n-paraffins that precipitate out of paraffinic hydrocarbon oils in the course of cooling is weaker than in the case of paraffin inhibitors having essentially linear long-chain alkyl radicals. Especially in the case of relatively high proportions of short-chain and/or branched alkyl radicals, this leads to attenuation of the efficacy, and requires higher dosage rates of the paraffin inhibitor for the establishment of the desired pour point of the hydrocarbon oil; in some cases, however, it is not possible to achieve the pour points achievable with paraffin inhibitors having essentially linear alkyl chains.

There has consequently been a search for paraffin inhibitors for paraffinic hydrocarbon oils that are free-flowing and pumpable as concentrates at low temperatures below 20° C., especially below 15° C. and particularly below 10° C. At the same time, they are to show efficacy at least comparable to the known additives, and preferably superior efficacy. The additives and especially their concentrates are to retain their performance properties and physical properties, such as their flowability in particular, over a prolonged period of several days to weeks, even at low storage temperatures. In order to achieve very substantially immediate lowering of the pour point after additization of the treated paraffinic hydrocarbon oil, it would also be desirable to improve the miscibility of the paraffin inhibitors into the hydrocarbon oil to be treated, especially at low temperatures. Since it is known that prior art paraffin inhibitors, especially those that are graft polymers of ethylene copolymers and alkyl (meth)acrylates, have high intrinsic pour points, it was also an object of the present invention to provide paraffin inhibitors having a low intrinsic pour point.

It has been found that, surprisingly, polymer compositions obtainable by free-radical polymerization of mixtures of alkyl (meth)acrylates that derive from linear $C_{16}$-$C_{40}$ fatty alcohols and from (meth)acrylic acid derivatives bearing an aromatic radical in the presence of copolymers of ethylene and unsaturated esters are free-flowing and pumpable even at low temperatures and simultaneously bring about excellent pour point depression in paraffinic hydrocarbon oils such as crude oil and products produced from crude oils. In addition, they have improved miscibility into hydrocarbon oils, especially at low temperatures. Concentrates of these polymer compositions in organic solvents remain free-flowing even after prolonged storage.

The invention firstly provides polymer compositions obtainable by free-radical polymerization of
  A) 95-40% by weight of a monomer mixture containing
    Ai) 65-98% by weight of at least alkyl (meth)acrylate having a linear $C_{16}$-$C_{40}$-alkyl radical and
    Aii) 2-35% by weight of at least one comonomer which is selected from (meth)acrylates and (meth)acrylamides and which bears an optionally substituted aromatic radical bonded via an alkylene, alkenylene, oxyalkylene or polyoxyalkylene group to the ester group of the (meth)acrylate or to the amide group of the (meth)acrylamide,
  in the presence of
  B) 5-60% by weight of at least one ethylene copolymer.

The invention secondly provides concentrated polymer compositions comprising
  I) a polymer composition obtainable by free-radical polymerization of
    A) 95-40% by weight of a monomer mixture containing
      Ai) 65-98% by weight of at least one alkyl (meth)acrylate having a linear $C_{16}$-$C_{40}$-alkyl radical and Aii) 2-35% by weight of at least one comonomer which is selected from (meth)acrylates and (meth)acrylamides and which bears an optionally substituted aromatic radical bonded via an alkylene, alkenylene, oxyalkylene or polyoxyalkylene group to the ester group of the (meth)acrylate or to the amide group of the (meth)acrylamide,
in the presence of B) 5-60% by weight of at least one ethylene copolymer, and II) an organic solvent (C).

The invention thirdly provides a process for producing the polymer compositions, in which the mixture of Ai and Aii is polymerized in the presence of B and optionally of an organic solvent, by addition of a free-radical chain initiator.

The invention fourthly provides a method of lowering the intrinsic pour point of polymer compositions that are graft polymers of ethylene copolymers with alkyl (meth)acrylates by free-radically polymerizing A) 95-40% by weight of a monomer mixture containing at least one alkyl (meth)acrylate Ai having a linear $C_{16}$-$C_{40}$-alkyl radical in an amount of 65-98% by weight, based on the total weight of the monomer mixture A), in the presence of B) 5-60% by weight of at least one ethylene copolymer, characterized in that 2% to 35% by weight, based on the total weight of monomer mixture A), of at least one comonomer Aii which is selected from (meth)acrylates and (meth)acrylamides and which bears an optionally substituted aromatic radical bonded via an alkylene, alkenylene, oxyalkylene or polyoxyalkylene group to the ester or amide group of the (meth)acrylate or (meth)acrylamide, is added to monomer mixture A) prior to the free-radical polymerization.

The invention fifthly provides for the use of the polymer compositions according to the first item of subject matter of the invention for improving the cold properties, for example lowering the pour point and/or improving paraffin dispersancy, in paraffinic hydrocarbon oils.

The invention sixthly provides paraffinic hydrocarbon oils having improved cold properties, comprising a polymer composition according to the first item of subject matter of the invention.

The invention seventhly provides for the use of a comonomer Aii) for lowering the intrinsic pour point of polymer compositions that are the product of a polymerization of alkyl (meth)acrylates Ai) in the presence of ethylene copolymers B), wherein Aii) is used in an amount of 2% to 35% by weight, based on the total weight of the monomer mixture of Ai) and Aii), together with 65-99% by weight of Ai) in a free-radical polymerization of A) 95-40% by weight of the monomer mixture of Ai) and Aii), in the presence of B) 5-60% by weight of at least one ethylene copolymer, and wherein Ai) contains at least one alkyl (meth)acrylate having a linear $C_{16}$-$C_{40}$-alkyl radical, and Aii) is at least one comonomer which is selected from (meth)acrylates and (meth)acrylamides and which bears an optionally substituted aromatic radical bonded via an alkylene, alkenylene, oxyalkylene or polyoxyalkylene group to the ester group of the (meth)acrylate or the amide group of the (meth)acrylamide.

The wording "alkyl (meth)acrylate" herein encompasses esters of acrylic acid and of methacrylic acid. The wording "(meth)acrylamide" herein encompasses amides of acrylic acid and of methacrylic acid. The wording "(meth)acrylic acid" herein encompasses acrylic acid and methacrylic acid.

The monomers Ai are esters of (meth)acrylic acid with linear fatty alcohols having 16 to 40 carbon atoms in the alkyl radical. Preferred monomers Ai have the general formula (1)

$$H_2C=C(R^1)-COOR^2 \quad (1)$$

where $R^1$ is H or a methyl group and preferably H and $R^2$ is a linear alkyl radical having 16 to 40 carbon atoms, preferably having 18 to 36 carbon atoms, more preferably having 18 to 30 carbon atoms and especially having 18 to 26 carbon atoms, for example having 16 to 30 carbon atoms, 16 to 36 carbon atoms or having 18 to 40 carbon atoms.

Preferred monomers Ai are esters of acrylic acid where $R^1$ is hydrogen.

Examples of preferred $R^2$ radicals are the 1-hexadecyl, 1-octadecyl, 1-nonadecyl, 1-eicosyl, 1-heneicosyl, 1-docosyl, 1-tetracosyl, 1-hexacosyl, 1-octacosyl and the 1-tricontyl radical. Examples of preferred monomers Ai are hexadecyl acrylate, octadecyl acrylate, nonadecyl acrylate, eicosyl acrylate, heneicosyl acrylate, docosyl acrylate, tetracosyl acrylate and hexacosyl acrylate.

Particular preference is given to using mixtures of different alkyl (meth)acrylates Ai. For example, it is possible to use mixtures in which $R^2$ represents $C_{16}$ and $C_{18}$ radicals or represents $C_{18}$, $C_{20}$ and $C_{22}$ radicals. In a preferred embodiment, at least one of the alkyl (meth)acrylates Ai used is 1-docosyl acrylate, i.e. $R^2$ is a linear alkyl radical having 22 carbon atoms. In a particularly preferred embodiment of the invention, at least 20% by weight and especially at least 25% by weight of the alkyl (meth)acrylates Ai used is 1-docosyl acrylate. In a preferred embodiment, mixtures comprising 1-octadecyl (meth)acrylate, 1-eicosyl (meth)acrylate and 1-docosyl (meth)acrylate are used. Mixtures of different (meth)acrylates are obtainable, for example, by esterifying appropriate fatty alcohol mixtures with acrylic acid or methacrylic acid. To some degree, they are also commercially available. As well as the $C_{18}$/$C_{20}$/$C_{22}$ (meth)acrylates mentioned, they may also comprise small amounts of (meth)acrylates having a higher or lower carbon number as by-products. For example, this may involve mixtures comprising 30% to 50% by weight of 1-octadecyl (meth)acrylate, 10% to 20% by weight of 1-eicosyl (meth)acrylate and 30% to 60% by weight of 1-docosyl (meth)acrylate. Particular preference is given to mixtures of the abovementioned acrylates.

In a preferred embodiment, the comonomers Aii derive from esters and amides of (meth)acrylic acid with aromatic compounds bearing hydroxyl groups or amino groups. Preferred aromatic compounds have 1 or more aromatic rings, for example 1, 2, 3 or 4 aromatic rings each having 4 n+2π electrons (aromatic system). As well as carbon atoms, the aromatic system may also contain one or more heteroatoms, for example 1, 2 or 3 heteroatoms. Preferred heteroatoms here are nitrogen and oxygen, and especially nitrogen. If the aromatic compound contains two or more aromatic rings, these are fused in a preferred embodiment.

In a further preferred embodiment, the aromatic rings are bonded to one another via a C—C bond or via an alkylene radical having 1 to 4 carbon atoms and more preferably having 1 or 2 carbon atoms. Preferred aromatic systems have 6 to 30 carbon atoms or 5 to 29 carbon atoms and one nitrogen atom, or 3 to 28 carbon atoms and 2 nitrogen atoms. Examples of preferred aryl radicals are phenyl, pyridyl, naphthyl, anthryl, phenanthryl, biphenyl, cumylphenyl, distyrylphenyl and tristyrylphenol radicals. A particularly preferred aromatic system is the phenyl radical.

The aromatic system preferably bears just one hydroxyl or amino group. Further preferably, hydroxyl groups and also amino groups are bonded to the aromatic system via a binding element containing one or more carbon atoms.

Particularly preferred comonomers Aii have the general formula (2)

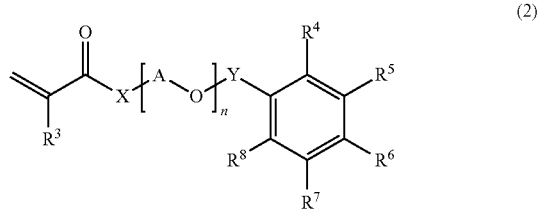

(2)

in which
$R^3$ is hydrogen or methyl,
$R^4$, $R^5$, $R^6$, $R^7$ and $R^8$ are independently hydrogen, a $C_1$-$C_4$-alkyl radical, a $C_1$-$C_4$-alkylaryl radical, an oxy-$C_1$-$C_6$-alkyl radical or a cyano, nitro, halogen or sulfonate group,
X is oxygen or $NR^9$,
A is an alkylene radical having 2 to 6 carbon atoms,
n is 0 or an integer from 1 to 10, with the proviso that, when n=1, Y is not a single bond between the aromatic system and the oxygen of the oxyalkylene group,
Y is an alkylene group having 1 to 10 carbon atoms, an alkenylene group having 3 to 10 carbon atoms, a carbonyl group, a group of the formula —C(=O)—$R^{10}$—, a single bond between the aromatic system and the oxygen of the oxyalkylene group or of the polyoxyalkylene group or, when n is 0, is a single bond between the aromatic system and X,
$R^9$ is hydrogen or a $C_1$-$C_{20}$-alkyl radical and
$R^{10}$ is a single bond, an alkylene group having 1 to 6 carbon atoms or an alkenylene group having 3 to 6 carbon atoms.

In a first especially preferred embodiment, the (meth) acrylic ester group $CH_2$=$C(R^3)$—C(=O)—O— and the aromatic system of the comonomer Aii are joined via an alkylene group having 1 to 10 carbon atoms or an alkenylene group having 3 to 10 carbon atoms. Preferred binding elements Y are alkylene radicals having 1 to 4 carbon atoms, for example methylene, ethylene or propylene groups, and alkenylene groups having 3 to 4 carbon atoms, for example a propenylene group. In this embodiment, the comonomers Aii preferably have the structural formulae 2a

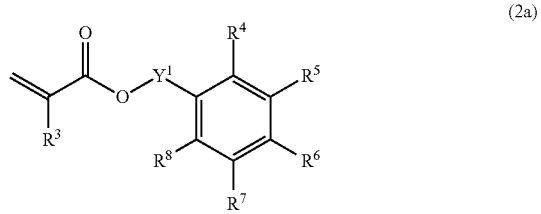

(2a)

in which
$R^3$ is hydrogen or methyl,
$R^4$, $R^5$, $R^6$, $R^7$ and $R^8$ are independently hydrogen, a $C_1$-$C_{20}$-alkyl radical, a $C_1$-$C_4$-alkylaryl radical, an oxy-$C_1$-$C_6$-alkyl radical or a cyano, nitro, halogen or sulfonate group,
$Y^1$ is an alkylene group having 1 to 10 carbon atoms or an alkenylene group having 3 to 10 carbon atoms.

In a second especially preferred embodiment, the (meth) acrylic ester group $CH_2$=$C(R^3)$—C(=O)—O— and the aromatic system of the comonomer Aii are joined via a poly(oxyalkylene) group. In this embodiment, the comonomers Aii preferably have the structural formulae 2b

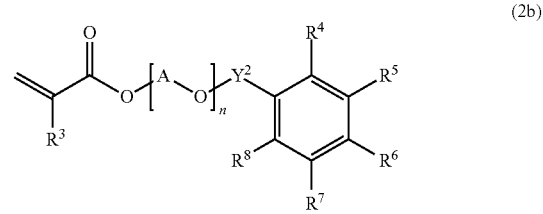

(2b)

in which
$R^3$ is hydrogen or methyl,
$R^4$, $R^5$, $R^6$, $R^7$ and $R^8$ are independently hydrogen, a $C_1$-$C_{20}$-alkyl radical, a $C_1$-$C_4$-alkylaryl radical, an oxy-$C_1$-$C_6$-alkyl radical or a cyano, nitro, halogen or sulfonate group,
A is an alkylene radical having 2 to 6 carbon atoms,
n is an integer from 2 to 10 and
$Y^2$ is a single bond between the aromatic system and the oxygen of the polyoxyalkylene group, or is an alkylene group having 1 to 10 carbon atoms or an alkenylene group having 3 to 10 carbon atoms.

Preferred poly(oxyalkylene) groups are obtainable, for example, by alkoxylation of a hydroxyl group bonded directly to the aromatic system, where $Y^2$ is a single bond, or else of a hydroxyl group bonded to the aromatic system via a $C_1$- to $C_{10}$-alkylene group or a $C_3$- to $C_{10}$-alkenylene group and preferably via a $C_1$- to $C_4$-alkylene group. The alkoxylation level n is preferably 1 to 10 mol of alkylene oxide per hydroxyl group and more preferably 1 to 4 mol of alkylene oxide per hydroxyl group. Preferred alkylene oxides are ethylene oxide, propylene oxide, butylene oxide and mixtures thereof.

In a further, especially preferred embodiment, the binding element between the aromatic system and the oxyalkylene or polyoxyalkylene group —[A—O]$_n$— is a carbonyl group. In this embodiment, aromatic system and (poly)oxyalkylene group are consequently joined via a further ester group. In this embodiment, the comonomers Aii preferably have the structural formulae 2c

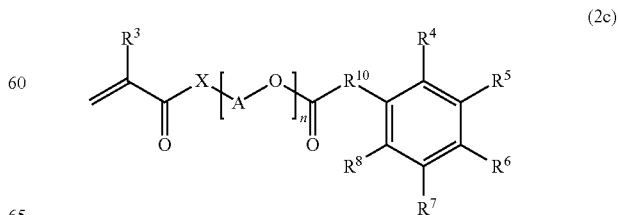

(2c)

in which

R³, R⁴, R⁵, R⁶, R⁷, R⁸, X, A and R¹⁰ have the definitions given above and n is an integer from 1 to 10.

This embodiment encompasses, for example, esters of alkoxylates of aromatic carboxylic acids with (meth)acrylic acid. In preferred aromatic carboxylic acids, the carboxyl group may be bonded directly to the aromatic system, or to the aromatic system via a binding element $R^{10}$, for example an alkylene group having 1 to 6 carbon atoms or an alkenylene group having 3 to 6 carbon atoms. Examples of preferred aromatic carboxylic acids are benzoic acid, nicotinic acid, phenylacetic acid and cinnamic acid.

In a preferred embodiment, the aromatic system bears one to four further substituents, more preferably 1 to 2 and especially one further substituent. Preferred substituents are alkyl radicals, $C_1$-$C_4$-alkylaryl radicals, oxyalkyl radicals, and cyano, nitro, halogen and sulfonate groups. Preferred alkyl radicals have 1 to 20 carbon atoms, more preferably 1 to 10 carbon atoms and especially 1 to 4 carbon atoms. The alkyl radicals may be linear or, if the alkyl group has three or more carbon atoms, branched. Examples of preferred alkyl groups are methyl, ethyl, propyl, isopropyl, n-butyl, isobutyl, tert-butyl, octyl, nonyl, decyl, dodecyl, tridecyl radicals, and alkyl radicals derived from higher homologs of propene and butene, and mixtures thereof. Preferred oxyalkyl radicals have a $C_1$-$C_6$-alkyl radical bonded to the aromatic system via an oxygen atom, for example a methoxy or ethoxy radical. Examples of preferred aromatic systems bearing a further substituent are tert-butylphenol, di-tert-butylphenol, nonylphenol, cardanol, methoxyphenol and ethoxyphenol. Preferred alkylaryl radicals have a further aryl radical bonded to the aromatic system via a $C_1$-$C_4$-alkylene radical. An example of a preferred alkylaryl radical is the styryl radical.

Examples of preferred comonomers bearing an optionally substituted aromatic system bonded to a (meth)acrylic ester group or to a (meth)acrylamide via an alkylene, alkenylene, oxyalkylene or polyoxyalkylene group are benzyl acrylate, 2-phenylethyl acrylate, cinnamyl acrylate, benzylacrylamide, benzyl methacrylate, 2-phenylethyl methacrylate, cinnamyl methacrylate, benzylmethacrylamide, esters of (meth)acrylic acid with alkoxylates of phenol and also of $C_1$-$C_{20}$-alkylphenols with 1 to 20 mol and preferably 2 to 10, for example 1 to 10 or 2 to 20 mol, of ethylene oxide, propylene oxide and/or butylene oxide, and esters of hydroxyethyl (meth)acrylate with benzoic acid, methylbenzoic acid (toluic acid) or phenylacetic acid or of hydroxypropyl (meth)acrylate with benzoic acid, methylbenzoic acid or phenylacetic acid.

In a further preferred embodiment, $R^4$, $R^5$, $R^6$, $R^7$, $R^8$ are simultaneously H.

Preferred comonomers Aii are preparable by known methods and in most cases are also commercially available. For example, it is possible to prepare comonomers Aii containing (meth)acrylate groups by esterifying (meth)acrylic acid with an aromatic compound that bears a hydroxyl group and is of the formula (3)

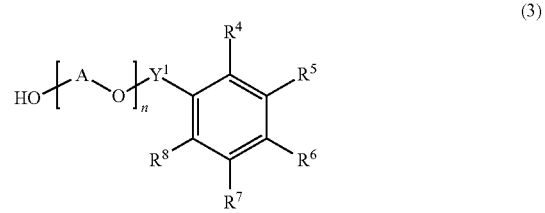

in which A, Y, $R^4$, $R^5$, $R^6$, $R^7$, $R^8$ and n have the definitions given above. Particularly preferred alcohols here are benzyl alcohol, 2-phenylethanol, cinnamyl alcohol, phenol and $C_1$-$C_{20}$-alkylphenols. Preferred (meth)acrylamides are obtainable, for example, by condensation of (meth)acrylic acid with appropriate aryl- or arylalkylamines, for example benzylamine, 2-phenylethylamine and 1-phenylethylamine.

Monomer mixture A) contains 65% to 98% by weight, preferably 70% to 95% by weight and especially 75% to 90% by weight, for example 65% to 95% by weight, 65% to 90% by weight, 70% to 98% by weight, 70% to 90% by weight, 75% to 98% by weight or 75% to 95% by weight, of at least one alkyl (meth)acrylate Ai. In addition, it contains 2% to 35% by weight, more preferably 2% to 30% by weight and especially 5% to 25% by weight, for example 2% to 40% by weight, 1% to 25% by weight, 2% to 25% by weight, 5% to 35% by weight or 5% to 30% by weight, of at least one alkyl (meth)acrylate Aii, based in each case on the total mass of monomer mixture A). In a specific embodiment, the amounts of alkyl (meth)acrylate Ai and alkyl (meth)acrylate Aii add up to 100%.

As well as monomers Ai and Aii, polymer A) may optionally include further structural units that derive from one or more further monoethylenically unsaturated monomers Aiii. The monomers Aiii are different than the monomers Ai and Aii. With the aid of the further monomers Aiii, it is possible to further modify the properties of the polymers of the invention and the properties of the formulations comprising these polymers, and to adjust the desired properties.

The proportion of the further monoethylenically unsaturated compounds Aiii is preferably below 20% by weight, more preferably below 10% by weight and especially below 5% by weight, based in each case on the total mass of monomers A). In a particularly preferred embodiment, the polymer of the invention does not contain any further monomers Aiii.

Suitable further ethylenically unsaturated compounds Aiii are, for example, ethylenically unsaturated esters of the general formula (4)

$$H_2C=C(R^1)-COOR^{11} \qquad (4)$$

where $R^1$ is hydrogen or methyl and $R^{11}$ is a linear alkyl radical having 1 to 11, preferably having 2 to 10 and especially having 2 to 6 carbon atoms, is a branched alkyl radical having 4 to 17, preferably having 4 to 16 and more preferably having 4 to 15 carbon atoms, or is a cyclic alkyl radical having 5 to 20, preferably having 6 to 12 and more preferably having 6 to 10 carbon atoms.

Examples of linear alkyl radicals $R^{11}$ include methyl, ethyl, n-propyl, n-butyl, n-pentyl, n-hexyl, n-heptyl, n-octyl, n-nonyl, n-decyl, n-undecyl, and n-dodecyl radicals, preference is given to n-propyl, n-butyl, n-pentyl, n-hexyl, n-heptyl, n-octyl, n-nonyl and n-decyl radicals, particular preference is given to ethyl, n-propyl, n-butyl, n-pentyl and n-hexyl radicals, and very particular preference is given to n-butyl radicals. Examples of suitable alkyl (meth)acrylates with a linear alkyl radical are ethyl (meth)acrylate, propyl (meth)acrylate, butyl (meth)acrylate, pentyl (meth)acrylate and hexyl (meth)acrylate.

Branched alkyl radicals $R^{11}$ may be singly or multiply branched. Examples of branched alkyl radicals $R^{11}$ include i-butyl, t-butyl, 2,2'-dimethylpropyl, 2-ethylhexyl, 2-propylheptyl, i-nonyl, i-decyl, i-tridecyl, i-heptadecyl radicals, and the alkyl radicals derived from oligomers of propene, n-butene and isobutene, such as tripropenyl, tetrapropenyl, pentapropenyl, tributenyl and tetrabutenyl radicals. Preference is given to t-butyl, 2-ethylhexyl, 2-propylheptyl radicals, and tetrapropenyl and tributenyl radicals. Examples of suitable alkyl (meth)acrylates with a branched alkyl radical are t-butyl (meth)acrylate, 2-ethylhexyl (meth)acrylate, 2-propylheptyl (meth)acrylate, and tetrapropenyl (meth) acrylate and tributenyl (meth)acrylate.

Further alkyl (meth)acrylates preferred as further comonomer Aiii have the general formula (5)

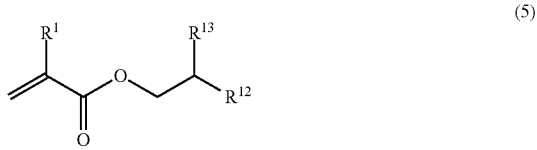

(5)

where $R^1$ is hydrogen or methyl and $R^{12}$ and $R^{13}$ are independently a saturated linear alkyl radical having 6 to 20 carbon atoms and the sum total of the carbon atoms in $R^{12}$ and $R^{13}$ is between 16 and 40.

Preferably, the alkyl (meth)acrylates of the formula (5) derive from $C_8$ to $C_{22}$ alcohols bearing an alkyl radical having 6 to 20 carbon atoms in the 2 position to the hydroxyl group. Preferred alcohols for preparation of the esters of the formula (5) have a total of 18 to 36 and especially 18 to 32 carbon atoms, meaning that the sum total of the carbon atoms in the $R^{12}$ and $R^{13}$ radicals is preferably 16 to 34 and especially 16 to 30. Preferably, the alkyl radicals $R^{12}$ and $R^{13}$ of the alkyl (meth)acrylates of the formula (5) have a different number of carbon atoms. In a particularly preferred embodiment, one of the $R^{12}$ and $R^{13}$ radicals has four carbon atoms more than the other. These 2-alkyl-1-alkanols are also referred to as Guerbet alcohols. Particular preference is given to the abovementioned alkyl acrylates Aiii.

Cyclic alkyl radicals $R^{11}$ may be monocyclic or polycyclic; they are preferably mono- or bicyclic. They may also be substituted by linear and/or branched alkyl radicals. Examples of cyclic alkyl radicals $R^{11}$ include cyclopentyl, cyclohexyl, 4-methylcyclohexyl, cycloheptyl, bicyclo[2.2.1]heptyl, bicyclo[2.2.2]octyl or 2-(1,7,7-trimethylbicyclo[2.2.1]heptyl radicals. Examples of suitable alkyl (meth)acrylates with a cyclic alkyl radical are cyclohexyl (meth)acrylate and bicyclo[2.2.1]heptyl (meth)acrylate.

Further examples of ethylenically unsaturated compounds Aiii are vinyl esters of carboxylic acids having 1 to 20 carbon atoms, α-olefins having 6 to 40 carbon atoms, vinylaromatics, ethylenically unsaturated dicarboxylic acids and their anhydrides and esters with $C_{10}$-$C_{30}$ fatty alcohols, acrylic acid, methacrylic acid and especially ethylenically unsaturated compounds bearing further functional groups, for example hydroxyethyl acrylate, hydroxypropyl acrylate, hydroxybutyl acrylate, dimethylaminoethyl acrylate, perfluoroalkyl acrylate, vinyl methoxyacetate, the isomers of vinylpyridine and its derivatives, N-vinylpyrrolidone, and (meth)acrylamide and its derivatives such as N-alkyl(meth)acrylamides with $C_1$-$C_{20}$-alkyl radicals.

It is also possible in accordance with the invention to use mixtures of two or more different ethylenically unsaturated compounds Aiii. If mixtures of different monomers Aiii are used, the total amount thereof is within the range described for Aiii.

If a further monomer Aiii is present in monomer mixture A), monomer mixture A) contains preferably 65% to 98%, particularly 70% to 95% and especially 75% to 90% by weight, for example 65% to 95% by weight, 65% to 90% by weight, 70% to 98% by weight, 70% to 90% by weight, 75% to 98% by weight or 75% to 95% by weight, of at least one alkyl (meth)acrylate Ai based on the total mass of monomer mixture A).

In the presence of a further monomer Aiii, the alkyl (meth)acrylates A) further preferably contain 1% to 34%, particularly 2% to 28% and especially 5% to 20% by weight, for example 1% to 28% by weight, 5% to 20% by weight, 2% to 34% by weight, 2% to 20% by weight, 5% to 34% by weight or 5% to 28% by weight, of at least one (meth)acrylic acid derivative Aii bearing an aromatic radical, based on the total mass of monomer mixture A).

In the case that it is present, the further monomer Aiii is present in monomer mixture A) preferably to an extent of 1% to 20% by weight, more preferably to an extent of 2% to 15% by weight and especially to an extent of 5% to 10% by weight, for example to an extent of 1% to 15% by weight, 1% to 10% by weight, 2% to 20% by weight, 2% to 10% by weight, 5% to 20% by weight or 5% to 15% by weight, based on the total mass of monomer mixture A).

Preferred copolymers of ethylene (B) are copolymers of ethylene with ethylenically unsaturated esters, ethers and/or alkenes. Particularly suitable copolymers are those that contain, aside from ethylene, 4 to 18 mol %, particularly 7 to 15 mol % and especially 8 to 14 mol %, for example 4 to 17 mol %, 4 to 14 mol %, 7 to 18 mol %, 7 to 14 mol %, 8 to 18 mol % or 8 to 15 mol %, of at least one vinyl ester, acrylic ester, methacrylic ester, alkyl vinyl ether and/or alkene. Preferred comonomers are vinyl esters, acrylic esters and/or methacrylic esters. If the ethylene copolymer should contain two (terpolymer) or more different comonomers, for example three (tetrapolymer) or four (pentapolymer), the above-specified molar comonomer contents relate to the sum total of all comonomer contents.

The vinyl esters preferred for the copolymerization with ethylene are those of the formula (6)

(6)

in which $R^{14}$ is $C_1$- to $C_{30}$-alkyl, preferably $C_4$- to $C_{16}$-alkyl, especially $C_6$- to $C_{12}$-alkyl.

The alkyl radicals may be linear or branched. In a preferred embodiment, they are linear alkyl radicals having 1 to 18 carbon atoms, for example $C_1$- to $C_{16}$-alkyl or $C_1$- to $C_{12}$-alkyl radicals In a further preferred embodiment, $R^{14}$ is a branched alkyl radical having 3 to 30 carbon atoms and preferably having 5 to 16 carbon atoms, for example having 5 to 30 or 3 to 16 carbon atoms. Particularly preferred vinyl esters derive from secondary and especially tertiary carboxylic acids, the branch of which is in the alpha position to the carbonyl group. Especially preferred here are the vinyl esters of tertiary carboxylic acids which are also referred to as Versatic acid vinyl esters and which have neoalkyl radicals having 5 to 11 carbon atoms, especially having 8, 9 or 10 carbon atoms. In a further embodiment, the alkyl groups mentioned may be substituted by one or more hydroxyl groups.

Examples of preferred vinyl esters include vinyl acetate, vinyl propionate, vinyl butyrate, vinyl isobutyrate, vinyl hexanoate, vinyl heptanoate, vinyl octanoate, vinyl pivalate, vinyl 2-ethylhexanoate, vinyl laurate, vinyl stearate and Versatic esters such as vinyl neononanoate, vinyl neodecanoate, vinyl neoundecanoate. An especially preferred vinyl ester is vinyl acetate.

In a further preferred embodiment, the ethylene copolymers B) contain vinyl acetate and at least one further vinyl ester of the formula 6 in which $R^{14}$ is $C_4$- to $C_{30}$-alkyl, preferably $C_4$- to $C_{16}$-alkyl, especially $C_6$- to $C_{12}$-alkyl, for example $C_4$- to $C_{12}$-alkyl. Preferred further vinyl esters here are the above-described vinyl esters of this chain length range, for example vinyl butyrate, vinyl isobutyrate, vinyl hexanoate, vinyl heptanoate, vinyl octanoate, vinyl pivalate, vinyl 2-ethylhexanoate, vinyl laurate, vinyl stearate, and Versatic esters such as vinyl neononanoate, vinyl neodecanoate, vinyl neoundecanoate.

The acrylic and methacrylic esters preferred for the copolymerization with ethylene are those of the formula (7)

$$CH_2=CR^{15}-COOR^{16} \qquad (7)$$

in which
$R^{15}$ is hydrogen or methyl and
$R^{16}$ is $C_1$- to $C_{30}$-alkyl, preferably $C_4$- to $C_{16}$-alkyl, especially $C_6$- to $C_{12}$-alkyl.

The alkyl radicals $R^{16}$ may be linear or branched. In a preferred embodiment, they are linear. In a further preferred embodiment, they have a branch at the carbon atom adjacent to the ester moiety. Suitable acrylic esters include, for example, methyl (meth)acrylate, ethyl (meth)acrylate, propyl (meth)acrylate, n- and isobutyl (meth)acrylate, hexyl (meth)acrylate, octyl (meth)acrylate, 2-ethylhexyl (meth) acrylate, decyl (meth)acrylate, dodecyl (meth)acrylate, tetradecyl (meth)acrylate, hexadecyl (meth)acrylate, octadecyl (meth)acrylate and mixtures of these comonomers.

The alkyl vinyl ethers preferred for the copolymerization with ethylene are compounds of the formula (8)

$$CH_2=CH-OR^{17} \qquad (8)$$

in which
$R^{17}$ is $C_1$- to $C_{30}$-alkyl, preferably $C_4$- to $C_{16}$-alkyl, especially $C_6$- to $C_{12}$-alkyl.

The alkyl radicals $R^{17}$ may be linear or branched. Examples include methyl vinyl ether, ethyl vinyl ether, isobutyl vinyl ether.

The alkenes preferred for the copolymerization with ethylene are monounsaturated hydrocarbons having 3 to 30 carbon atoms, particularly 4 to 16 carbon atoms and especially 5 to 12, for example 3 to 16 or 3 to 12, carbon atoms. Suitable alkenes include propene, butene, isobutene, pentene, hexene, 4-methylpentene-1, heptene, octene, decene, diisobutylene, and norbornene and derivatives thereof such as methylnorbornene and vinylnorbornene. Particular preference is given to propene, 4-methylpentene-1 and diisobutylene.

The alkyl radicals $R^{14}$, $R^{16}$ and $R^{17}$ may independently bear, in minor amounts, functional groups, for example amino, amido, nitro, cyano, hydroxyl, keto, carbonyl, carboxyl, ester, sulfo groups and/or halogen atoms, provided that these do not significantly impair the hydrocarbon character of the radicals mentioned. More preferably, the alkyl radicals $R^{14}$, $R^{16}$ and $R^{17}$ independently bear not more than one of the functional groups mentioned.

Particularly preferred terpolymers contain, apart from ethylene, 3 to 15 mol %, especially 5 to 13 mol %, for example 3 to 13 mol % or 3 to 15 mol %, of vinyl acetate and 0.1 to 12 mol %, particularly 0.2 to 10 mol % and especially 0.5 to 8 mol %, for example 0.1 to 10 mol %, 0.1 to 8 mol %, 0.2 to 12 mol %, 0.2 to 8 mol %, 0.5 to 12 mol % or 0.5 to 10 mol %, of at least one long-chain vinyl ester, (meth)acrylic ester and/or alkene (termonomer), where the total comonomer content is between 4 and 18 mol %, preferably between 7 and 15 mol %, for example 4 to 17 mol %, 4 to 14 mol %, 7 to 18 mol %, 7 to 14 mol %, 8 to 18 mol % or 8 to 15 mol %. Particularly preferred termonomers here are vinyl 2-ethylhexanoate, vinyl neononanoate, vinyl neodecanoate, 2-ethylhexyl acrylate, 2-propylheptyl acrylate and 4-methyl-2-propylhexyl acrylate.

Further particularly preferred copolymers contain, as well as ethylene and 3 to 15 mol %, especially 5 to 13 mol %, for example 3 to 13 mol % or 5 to 15 mol %, of vinyl esters, 0.1 to 6 mol %, preferably 0.2 to 5 mol %, for example 0.1 to 5 mol %, or 0.2 to 6 mol %, of at least one olefin having 3 to 8 carbon atoms, such as propene, butene, isobutene, hexene, 4-methylpentene, octene, diisobutylene, norbornene and/or styrene.

Examples of suitable terpolymers contain, as well as ethylene, two different vinyl esters, two different alkyl (meth)acrylates, one vinyl ester and one alkyl (meth)acrylate, one vinyl ester and one olefin, or one alkyl (meth) acrylate and one olefin.

The number-average molecular weight of the ethylene copolymers B) is preferably between 1000 and 100 000 and especially between 2500 and 50 000, for example between 1000 and 50 000 or between 2500 and 100 000, g/mol. The MF1190 values of the ethylene copolymers B), measured to DIN 53735 at 190° C. and an applied weight of 2.16 kg, are preferably between 0.1 and 1200 g/10 min and especially between 1 and 900 g/10 min, for example between 0.1 and 900 g/10 min or between 1 and 1200 g/10 min. The levels of branching determined by means of 1H NMR spectroscopy are preferably between 1 and 9 $CH_3/100$ $CH_2$ groups, especially between 2 and 6 $CH_3/100$ $CH_2$ groups, for example between 1 and 6 $CH_3/100$ $CH_2$ groups or between 2 and 9 $CH_3/100$ $CH_2$ groups that do not come from the comonomers.

In a preferred embodiment, mixtures of two or more of the abovementioned ethylene copolymers are used. The parent polymers of the mixtures preferably differ in at least one characteristic. For example, they may contain different comonomers or have different comonomer contents, molecular weights and/or levels of branching. In preferred mixtures, each individual ethylene copolymer has a proportion by mass of at least 5% by weight, based on the total mass of B).

The copolymers B) are prepared by known processes (in this regard cf., for example, Ullmanns Encyclopädie der Technischen Chemie [Ullmann's Encyclopedia of Industrial Chemistry], 5th edition, Vol. A 21, pages 305 to 413). Suitable methods are polymerization in solution, in suspension, in the gas phase and high-pressure bulk polymerization. Preference is given to employing high-pressure bulk polymerization which is conducted at pressures of 50 to 400 MPa, preferably 100 to 300 MPa, and temperatures of 50 to 350° C., preferably 100 to 300° C. The reaction of the comonomers is initiated by initiators that form free radicals (free-radical chain initiators). This substance class includes, for example, oxygen, hydroperoxides, peroxides and azo compounds, for example cumene hydroperoxide, t-butyl hydroperoxide, dilauroyl peroxide, dibenzoyl peroxide, bis (2-ethylhexyl) peroxodicarbonate, t-butyl permaleate, t-butyl perbenzoate, dicumyl peroxide, t-butyl cumyl peroxide, di(t-butyl) peroxide, 2,2'-azobis(2-methylpropanonitrile), 2,2'-azobis(2-methylbutyronitrile). The initiators are used individually or as a mixture of two or more substances in amounts of 0.01% to 20% by weight, preferably 0.05% to 10% by weight, based on the comonomer mixture.

The desired molecular weight, typically measured by the melt flow index MFI (190° C./2.16 kg) of the copolymers B), for a given composition of the comonomer mixture, is established by varying the reaction parameters of pressure and temperature and optionally by adding moderators. Useful moderators have been found to be hydrogen, saturated or unsaturated hydrocarbons, for example propane and propene, aldehydes, for example propionaldehyde, n-butyraldehyde and isobutyraldehyde, ketones, for example acetone, methyl ethyl ketone, methyl isobutyl ketone and cyclohexanone, or alcohols, for example butanol. Depending on the desired viscosity, the moderators are employed in amounts up to 20% by weight, preferably 0.05% to 10% by weight, based on the comonomer mixture.

High-pressure bulk polymerization is conducted batchwise or continuously in known high-pressure reactors, for example autoclaves or tubular reactors; tubular reactors have been found to be particularly useful. Solvents such as aliphatic hydrocarbons or hydrocarbon mixtures, toluene or xylene may be present in the reaction mixture, although the solvent-free mode of operation has been found to be particularly useful. In a preferred embodiment of the polymerization, the mixture of the comonomers, the initiator and, if used, the moderator is fed to a tubular reactor via the reactor inlet and via one or more side branches. It is possible here for the comonomer streams to be of different composition (EP-B-0 271 738).

The polymer compositions of the invention are obtainable by free-radical copolymerization of monomer mixture A) in the presence of the ethylene copolymers B). The performance of free-radical polymerizations is known in principle to the person skilled in the art.

The free-radical polymerization for preparation of the polymer compositions of the invention can be effected, for example, in the form of a bulk polymerization, by mixing the monomer mixture A) with the ethylene copolymer B) while stirring and heating, and polymerizing by addition of a free-radical chain initiator. On account of the viscosity of the ethylene copolymers, the bulk polymerization is effected preferably at temperatures above the melting point of the ethylene copolymer B), for example above 60° C., especially above 80° C. Temperatures between 60 and 150° C., particularly between 70 and 140 and especially between 80 and 120° C., for example between 60 and 120° C., between 60 and 140° C., between 70 and 150° C., between 70 and 120° C., between 80 and 150° C. or between 80 and 140° C., have been found to be particularly useful.

In a preferred embodiment of the invention, the polymer composition of the invention is prepared by means of free-radical polymerization in solution (solution polymerization). Suitable solvents for this purpose are in principle any in which the monomers A), the ethylene copolymers B) and the polymer composition formed have sufficient solubility or are at least homogeneously dispersed at the temperature in the copolymerization, even in the desired high concentration. Moreover, they should not enter into any unwanted reactions in the course of the polymerization. Suitable solvents should especially not be self-polymerizable and have a minimum moderating/chain-transferring effect under the chosen polymerization conditions.

In the solution polymerization, the amount of solvent is typically 0.1 to 10 times, preferably 0.5 to 5 times, the total amount of A) and B). More preferably, the proportion of the solvent in the total amount of A), B) and solvent and any further auxiliaries present is between 35% and 80% by weight and especially between 40% and 70% by weight, for example between 35% and 70% by weight or between 40% and 80% by weight.

The solvents suitable for the solution polymerization are preferably hydrocarbons, preferably aliphatic, cycloaliphatic and/or aromatic hydrocarbons, and mixtures thereof. Examples of suitable solvents are toluene, xylene, higher aromatics and higher-boiling aromatics mixtures and/or isoaliphatic solvents or solvent mixtures. In a preferred embodiment, the solvent used for the solution polymerization is a high-boiling aliphatic hydrocarbon or a mixture of such hydrocarbons having a boiling point of at least 175° C. and preferably a flashpoint above 60° C. Examples of suitable hydrocarbons having a flashpoint above 60° C. include n-undecane (flashpoint 60° C., boiling point 196° C.) and n-dodecane (flashpoint 71° C., boiling point 216° C.). Preference is given to using technical mixtures of hydrocarbons, for example mixtures of paraffinic hydrocarbons, mixtures of paraffinic and naphthenic hydrocarbons, or mixtures of isoparaffins. It will be clear to the person skilled in the art that technical mixtures may still contain minor proportions of aromatic or unsaturated hydrocarbons. The content of aromatic and/or unsaturated hydrocarbons is preferably below 20% by weight, often below 10% by weight and in some cases below 1% by weight. Technical mixtures of saturated aliphatic solvents are commercially available, for example technical mixtures from the Shellsol® D series, the Isopar® series or the Exxsol® D series. Solution polymerization affords a ready-to-use solvent-containing polymer composition that can be used as a pour point depressant directly or else after dilution with further solvent, without any need for further workup steps after the polymerization.

For solution polymerization, preference is given to first producing a solution of the monomers Ai, Aii and optionally Aiii used and of the ethylene copolymer (B) in the chosen solvent. The dissolving is effected by vigorously mixing the components, for example by stirring. In a first preferred embodiment, the monomers Ai, Aii and optionally Aiii are dissolved in the solvent and then the ethylene copolymer (B) is added, optionally as a preliminary dilution. In a further preferred embodiment, the ethylene copolymer (B) is dissolved in the solvent, and then the monomers Ai, Aii and optionally Aiii are added. The dissolving can be accelerated by an increase in the temperature, for example to about 50 to 90° C., and optionally even up to the boiling point of the solvent.

In a particularly preferred embodiment, a solution of monomers Ai and Aii in a solvent as described above which is also suitable for the later polymerization is prepared by esterifying (meth)acrylic acid with the mixture of an alcohol of the formula $R^2$—OH and an aromatic compound of the formula (3) that bears a hydroxyl group in said solvent, and using the resulting solution for polymerization after mixing with the ethylene copolymer B). The esterification can be conducted by methods known in principle to the person skilled in the art. For the esterification with (meth)acrylic acid, it is optionally possible to add further alcohols, for example those of the formula $R^{11}$—OH, which lead to formation of monomers Aiii. It is alternatively possible to feed in further monomers Aiii before or after the esterification.

In a preferred embodiment, the preparation of the monomers Ai and Aii and optionally further monomers Aiii and the subsequent polymerization thereof in the presence of the ethylene copolymer B) are effected in an aliphatic hydrocarbon or hydrocarbon mixture with low moderating action, for example an isoparaffinic solvent or solvent mixture having an initial boiling point above 150° C. and especially above 180° C. and a flashpoint of at least 60° C. Thus, transport and storage of the polymer compositions are simplified.

The free-radical copolymerization is effected using thermally decomposing initiators for the free-radical polymerization. Even though typically only one initiator is used, it has been found to be useful in various cases to use a mixture of two or more different initiators, for example with different half-lives. Preference is given to choosing the initiators used such that they are soluble in the polymerization medium. Preferred polymerization initiators include oil-soluble peroxides and azo compounds, especially those with a 10 h half-life of less than 70° C. and preferably less than 50° C. Such initiators are known in principle and commercially available. Based on the monomers A), they are preferably used in amounts of 0.1% to 2.0% by weight, for example in amounts of 0.2% to 1.5% by weight.

In addition, it is possible to add molecular weight regulators in a manner known in principle. Examples of regulators include alcohols such as isopropanol, allyl alcohol or buten-2-ol, thiols such as ethanethiol or dodecanethiol, and aldehydes such as crotonaldehyde. The amount of the molecular weight regulators is generally 1% to 4% by weight, preferably 1.5% to 3% by weight, based on the total amount of monomers A).

The free-radical copolymerization is triggered in a manner known in principle by heating the reaction mixture. The polymerization temperature should be above the 10 h half-life of the initiator and is generally at least 50° C. A particularly useful polymerization temperature has been found to be between 50 and 140° C., especially between 55 and 100° C. In general, the polymerization is undertaken in a manner known in principle under a protective gas, for example nitrogen. Polymerization in solution can be undertaken by initially charging a suitable, preferably stirred, reaction vessel with the solution of the starting materials. If desired, one or more molecular weight regulators are added to the solution. Once the desired polymerization temperature has been attained, a solution of the initiator is added to the mixture to be polymerized. It is possible here to add the total amount of the initiator at the start of the polymerization, but preference is given to adding the initiator over a period of 10 minutes to 5 hours, preferably 30 minutes to 2 hours. The addition can be effected in defined portions or continuously. The completion of addition of the initiator should generally be followed by a period of further polymerization. This may be, for example, 0.5 to 5 h.

The ratio of monomer mixture A) to ethylene copolymers B) is chosen according to the desired properties of the polymer composition to be synthesized, where the proportion of the monomer mixture A) is 40% to 95% by weight, preferably 50% to 90% by weight, more preferably 60% to 80% by weight, for example 40% to 90% by weight, 40% to 80% by weight, 50% to 95% by weight, 50% to 80% by weight, 60% to 95% by weight or 60% to 90% by weight, and the amount of ethylene copolymers B) is 5% to 60% by weight, preferably 10% to 50% by weight and more preferably 20% to 40% by weight, for example 5% to 50% by weight, 5% to 40% by weight, 10% to 60% by weight, 10% to 40% by weight, 20% to 60% by weight or 20% to 50% by weight, based in each case on the sum total of monomer mixture A) and ethylene copolymers B). In a specific embodiment, the amounts of A) and B) add up to 100% by weight. The above-specified amounts of A) and B) that result in the composition of the invention are in neat form, i.e. without solvent.

The polymer compositions of the invention are suitable for improvement of the cold properties of paraffinic hydrocarbon oils. They are particularly suitable for improving the cold properties of crude oils and paraffinic products produced therefrom, for example heavy heating oils, bunker oils and residue oils. Crude oils are understood here to mean those mineral oils obtained from a well. This also includes gas condensates and bitumen. They have a particularly advantageous effect on crude oils and residue oils. The polymer compositions of the invention modify the structure of the paraffins that precipitate out at low temperatures, which lowers the pour point of the paraffinic hydrocarbon oils.

The polymer composition of the invention is used as cold additive by adding at least one polymer composition of the invention to the paraffinic hydrocarbon oil. Customary added amounts are 10 to 10 000 ppm by weight, preferably 50 to 2000 ppm by weight, for example 10 to 2000 ppm by weight or 50 to 10 000 ppm by weight, of the polymer composition.

The polymer composition of the invention may be used as such. In a preferred embodiment of the invention, the polymer composition of the invention is used as concentrate in an organic solvent. In this embodiment, the polymer composition comprises an organic solvent or dispersant. As well as the concentrate obtained directly in the solution polymerization, the polymer composition may also be weakened with further solvent after production thereof. In this case, the polymer composition should be in homogeneously dispersed form, preferably dissolved form. Suitable solvents are in principle any that meet these requirements. It is also possible to use mixtures of different solvents.

Preferred organic solvents as a constituent of concentrates of the polymer compositions of the invention are, as well as the above-described solvents usable for the solution polymerization, especially aliphatic, cycloaliphatic and/or aromatic hydrocarbons and hydrocarbon mixtures. Particular preference is given to solvents having a flashpoint above 60° C., since fewer restrictions have to be observed when such solvents are used for transport and storage of the concentrates. Preferred solvents also have a boiling point of at least 175° C.

In a preferred embodiment, concentrates of the polymer compositions of the invention contain a saturated aliphatic hydrocarbon as solvent. This may be either a paraffinic or naphthenic, i.e. saturated, cyclic hydrocarbon. Particular preference is given to using a technical mixture of hydrocarbons, for example a mixture of paraffinic hydrocarbons, a mixture of paraffinic and naphthenic hydrocarbons, or a mixture of isoparaffins. It will be clear to the person skilled in the art that technical mixtures may still contain minor proportions of further components, for example aromatic or unsaturated hydrocarbons. Technical mixtures of saturated aliphatic hydrocarbons are commercially available, for example as Shellsol® D products, Isopar® products or Exxsol® D products. Kerosene is also suitable as aliphatic hydrocarbon mixture. Particular preference is given to aliphatic hydrocarbon mixtures having a flashpoint above 60° C.

In a further preferred embodiment, concentrates of the polymer compositions of the invention contain an aromatic hydrocarbon as solvent. Examples of preferred aromatic hydrocarbons are toluene, xylene, more highly alkylated mono- and bicyclic aromatics, and mixtures thereof. Technical mixtures of aromatic solvents are particularly preferred; they are commercially available, for example, as products from the Shellsol® A series or the Solvesso® series. Particular preference is given to using technical mixtures of aromatic hydrocarbons having a flashpoint above 60° C.

Further examples of suitable organic solvents are saturated aliphatic alcohols and esters of aliphatic carboxylic acids and aliphatic alcohols. Examples of suitable alcohols include aliphatic alcohols having at least eight carbon atoms, such as 1-octanol, 2-ethylhexanol, 1-decanol, 1-dodecanol and isotridecanol. Examples of suitable esters include esters of saturated fatty acids having at least eight carbon atoms with saturated aliphatic alcohols having 1 to 4 carbon atoms, for example methyl laurate or methyl stearate. Technical mixtures of different aliphatic esters are commercially available. In a further embodiment of the invention, esters of aliphatic or cycloaliphatic dicarboxylic acids may be used, for example dialkyl esters of cyclohexane-1,2-dicarboxylic acid such as diisononyl cyclohexane-1,2-dicarboxylate. Particularly preferred solvents have a flashpoint above 60° C.

The concentration of the polymer composition in the concentrate is chosen by the person skilled in the art in accordance with the desired properties of the formulation to be produced. Preferred concentrates have a content of polymer composition of the invention of 10% to 60% by weight, more preferably 20% to 50% by weight and especially 25% to 40% by weight, for example 10% to 50% by weight, 10% to 40% by weight, 20% to 60% by weight, 20% to 40% by weight, 25% to 60% by weight or 25% to 50% by weight, based in each case on the total mass of the concentrate. Such formulations are notable for a very low intrinsic pour point and hence simplified handling at low storage and transport temperatures.

In a preferred embodiment, the concentrate of the polymer composition of the invention is produced by means of the above-described process of solution polymerization at a solvent content intended for later use. In a further preferred embodiment, the polymerization is conducted in a solvent-free manner, or the solution polymerization is conducted at an elevated concentration of monomer mixture A) and ethylene copolymers B) compared to the desired concentrate, and the polymer composition thus produced is then converted to the concentrate by adding (further) organic solvent.

The incorporation of structural units Aii that derive from (meth)acrylates and/or (meth)acrylamides that bear an optionally substituted aromatic radical bonded via an alkylene, alkenylene, oxyalkylene or polyoxyalkylene group to the ester group of the (meth)acrylate or to the amide group of the (meth)acrylamide imparts various advantageous properties to the polymer compositions of the invention and especially the concentrates thereof.

The polymer compositions of the invention and especially the concentrates thereof in organic solvents, in spite of a comparatively high active ingredient content, are low-viscosity liquids. For example, the temperature below which, for example, 35% by weight concentrates of the polymer compositions of the invention assume a viscosity of more than 1000 mPas is well below that of comparable polymer compositions that do not contain any copolymerized (meth) acrylate derivatives bearing an aromatic radical. The low intrinsic pour point of the concentrates accordingly permits their use even at low temperatures of below 20° C., for example below 15° C., in some cases even below 10° C., and after addition of a small amount of further solvent even below 5° C., without heating of reservoir vessels and/or conveying conduits. They can thus be used even under unfavorable climatic conditions, for example in Arctic regions, and also in offshore applications, without further precautions to counter the solidification of the additives. Application down-the-hole is also possible without extreme dilution of the additives and without heating of the conveying conduits. Alternatively, at the same temperature, it is possible to transport and use more highly concentrated polymer compositions, which reduces storage and transport volume.

Surprisingly, this does not impair efficacy as pour point depressant for paraffinic hydrocarbon oils by comparison with the solutions proposed by WO 2014/095412 and WO 2017/108361; it is usually actually improved. Moreover, the polymer compositions of the invention have improved miscibility into paraffinic hydrocarbon oils compared to grafted poly(alkyl (meth)acrylates) of the prior art. This leads to faster development of the efficacy of the additive, and obviates the need for incorporation by intensive mixing.

As well as the use of the polymer compositions of the invention as such or as concentrate, they can also be formulated and used in combination with further active ingredients for the same purpose or different purposes. For example, it is possible to add to the formulation additional wax dispersants that differ in their chemical nature from the polymer compositions of the invention, which stabilize paraffin crystals formed and prevent them from sedimenting. Wax dispersants used may, for example, be alkylphenols, alkylphenol-formaldehyde resins and/or dodecylbenzenesulfonic acid. In addition, the polymer compositions of the invention may be used together with asphaltene dispersants that prevent precipitation of polycyclic hydrocarbons.

EXAMPLES

The raw materials used for the production of the polymer compositions of the invention and also for the production of the comparative specimens are listed in table 1. The molecular weight of the acrylates used was determined on the basis of the OH number of the alcohols used for preparation of the esters. For this purpose, the hydroxyl groups present in the sample in question were acetylated with acetic anhydride. The excess acetic anhydride was hydrolyzed, and the acetic acid formed was potentiometrically titrated with standard potassium hydroxide solution. The melt flow index MFI of the ethylene copolymers was determined to ISO 1133 at 190° C. and an applied weight of 2.16 kg. Unless stated otherwise, percentages are based on parts by weight.

TABLE 1

| | Raw materials used for the production of the polymer compositions |
|---|---|
| EVA 1 | Ethylene-vinyl acetate copolymer composed of 72% by weight of ethylene and 28% by weight of vinyl acetate; MFI (@190° C./2.16 kg) 6 g/10 min. |
| EVA 2 | Ethylene-vinyl acetate copolymer composed of 72% by weight of ethylene and 28% by weight of vinyl acetate; MFI (@190° C./2.16 kg) 40 g/10 min. |
| BA 1 | Technical mixture of alkyl acrylates with linear alkyl radical, containing, as main components, 57.9% by weight of $C_{18}$-, 7.9% by weight of $C_{20}$- and 34.2% by weight of $C_{22}$-alkyl acrylate. The average molecular weight was 345 g/mol. |
| BA 2 | Technical mixture of alkyl acrylates with linear alkyl radical, containing, as main components, 34.8% by weight of $C_{18}$-, 10.9% by weight of $C_{20}$- and 54.3% by weight of $C_{22}$-alkyl acrylate. The average molecular weight was 356 g/mol. |
| BNZA | benzyl acrylate |
| BNAA | benzylacrylamide |
| t-BA | tert-butyl acrylate |
| TPEA | acrylic ester of an ethoxylated tristyrylphenol with average ethoxylation level of 3.7. The average molecular weight of the ester was 593 g/mol. |
| NPEA | acrylic ester of an ethoxylated nonylphenol with average ethoxylation level of 4.0. The average molecular weight of the ester was 395 g/mol. |
| BPEA | acrylic ester of an ethoxylated tributylphenol with average ethoxylation level of 4.0. The average molecular weight of the ester was 505 g/mol. |

General Preparation Method

The esters in table 1 that were used for preparation of the polymer compositions of the invention, and also comparative examples, were prepared by esterifying the parent alcohols with acrylic acid in xylene with azeotropic removal of water of reaction. Benzylacrylamide and tert-butyl acrylate were commercially available products.

For preparation of the polymer compositions, 128.4 g of a mixture of EVA copolymer and acrylate/acrylamide according to the weight ratios specified in table 2 and compositions of the acrylate in 86.8 g of xylene (isomer mixture) were then mixed in a 500 ml multineck flask equipped with precision glass stirrer, internal thermometer, nitrogen inlet, reflux condenser, vacuum connection and septum, with stirring at a temperature of 65° C. After stirring for 2 hours, the reaction mixture, for inertization, was subjected to 3 cycles of evacuation to an internal pressure of 120 mbar and filling with nitrogen. Subsequently, the reaction vessel was evacuated to internal pressure 120 mbar. At an internal temperature of 65° C., 0.09 g of azobis(isobutyronitrile) (AIBN) dissolved in 1.1 g of xylene (isomer mixture) was added by means of a syringe via the septum. After half an hour, a further portion of AIBN (0.35 g) dissolved in 2.59 g of xylene was metered in. The mixture was stirred at 65° C. for a further 4 hours, before the reaction mixture was vented with nitrogen and stirred at an internal temperature of 95° C. for a further hour. Finally, the reaction mixture was cooled down to 65° C. and diluted with 148 g of xylene.

The resultant polymer compositions had a solids content of 35±1% by weight. The solids content was determined by drying an aliquot of the polymer composition at 140° C. and 100 mbar for 2 hours. Dynamic viscosity to DIN ISO 3219 was measured on the polymer compositions obtained, and in so doing the temperature at which the viscosity of the sample is 1000 mPas was determined. The intrinsic pour point of the product determined to DIN ISO 3016. The values ascertained are reported in table 2.

TABLE 2

Characterization of the polymer compositions

| | EVA | | Acrylate composition | | Temperature @ | Pour |
|---|---|---|---|---|---|---|
| Polymer | copolymer [% by wt.] | Acrylate [% by wt.] | linear (Ai) [mol %] | aromatic (Aii) [mol %] | 1000 mPas [° C.] | point [° C.] |
| P1 | 24.9 (EVA1) | 75.1 | 94.8 (BA1) | 5.2 (BNZA) | 18.4 | 21 |
| P2 | 25.3 (EVA1) | 74.7 | 88.7 (BA1) | 11.3 (BNZA) | 15.1 | 18 |
| P3 | 25.1 (EVA1) | 74.9 | 77.8 (BA1) | 22.7 (BNZA) | 12.5 | 12 |
| P4 | 25.1 (EVA1) | 74.9 | 70.8 (BA1) | 29.2 (BNZA) | 10.9 | 9 |
| P5 | 25.8 (EVA1) | 74.2 | 93.9 (BA1) | 6.1 (TPEA) | 15.6 | 18 |
| P6 | 25.8 (EVA1) | 74.2 | 91.2 (BA1) | 8.9 (NPEA) | 14.5 | 18 |
| P7 | 26.3 (EVA1) | 73.7 | 42.6 (BA1) | 25.4 (NPEA) | 13.4 | 15 |
| P8 | 25.6 (EVA1) | 74.4 | 83.2 (BA1) | 16.8 (BNAA) | 15.8 | 18 |
| P9 | 25.8 (EVA1) | 74.2 | 93.1 (BA1) | 6.9 (BPEA) | 14.2 | 18 |
| P11 (comp.) | 25.3 (EVA1) | 74.7 | 80.4 (BA1) | 19.6 (t-BA) | 13.0 | 12 |
| P12 (comp.) | 25.5 (EVA1) | 74.5 | 35.6 (BA1) | 64.4 (BNZA) | 10.1 | 9 |
| P13 (comp.) | 26.8 (EVA1) | 73.2 | 53.2 (BA1) | 46.8 (NPEA) | 11.4 | 12 |
| P14 (comp.) | 25.2 (EVA1) | 74.8 | 100.0 (BA1) | — | 19.8 | 24 |
| P15 | 19.7 (EVA2) | 80.3 | 90.2 (BA1) | 9.8 (BNZA) | 14.3 | 15 |
| P16 | 20.2 (EVA2) | 79.8 | 85.0 (BA1) | 15.0 (BNAA) | 16.1 | 18 |
| P17 (comp.) | 20.0 (EVA2) | 80.0 | 100.0 (BA1) | — | 19.0 | 21 |
| P18 | 25.3 (EVA1) | 74.7 | 95.4 (BA2) | 4.6 (BNZA) | | 24 |

TABLE 2-continued

Characterization of the polymer compositions

| Polymer | EVA copolymer [% by wt.] | Acrylate [% by wt.] | Acrylate composition linear (Ai) [mol %] | Acrylate composition aromatic (Aii) [mol %] | Temperature @ 1000 mPas [° C.] | Pour point [° C.] |
|---|---|---|---|---|---|---|
| P19 | 25.9 (EVA1) | 74.1 | 90.8 (BA2) | 9.2 (NPEA) | 18.7 | 21 |
| P20 | 25.9 (EVA1) | 74.1 | 93.3 (BA2) | 6.7 (BPEA) | 19.6 | 24 |
| P21 (comp.) | 25.2 (EVA1) | 74.8 | 100.0 (BA2) | — | 22.1 | 27 |

*) Viscosity and pour point of the polymer compositions were determined in 35 ± 1% by weight solutions of the polymers in xylene.

For determination of their efficacy, the polymer compositions were added to crude oils, and the pour point depression achieved thereby (pour point to ASTM D97) in the oil was determined. The test oils employed for the test were both wax-rich and asphaltene-rich crude oils. The characterization of the crude oils used is shown in table 3. The composition of the oils was undertaken by means of SARA analysis to IP 469-01. This determined the proportions in the crude oils of saturated hydrocarbons (saturates), aromatics, resins and asphaltenes. The pour points achieved in crude oils A to E are shown in tables 4 to 8. The dosage rates reported are based on the amount of added polymer composition according to table 2.

TABLE 3

Characterization of the test oils used

|  | Crude oil A | Crude oil B | Crude oil C | Crude oil D | Crude oil E |
|---|---|---|---|---|---|
| S(aturates) | 52% | 60% | 74% | 71% | 48% |
| A(romatics) | 24% | 23% | 13% | 15% | 23% |
| R(esins) | 7% | 13% | 4% | 4% | 27% |
| A(sphaltenes) | 17% | 4% | 9% | 10% | 2% |
| Pour point | 27° C. | 24° C. | 27° C. | 27° C. | 30° C. |

TABLE 4

Pour point depression in test oil A

| Example | Polymer; dosage rate | Pour point |
|---|---|---|
| 1 (comp.) | — | 27° C. |
| 2 | P1; 1000 ppm | 9 |
| 3 | P2; 1000 ppm | 9 |
| 4 | P3; 1000 ppm | 6 |
| 5 | P4; 1000 ppm | 9 |
| 6 (comp.) | P12; 1000 ppm | 15 |
| 7 (comp.) | P14; 1000 ppm | 9 |
| 8 (comp.) | P11; 1000 ppm | 18 |

TABLE 5

Pour point depression in test oil B

| Example | Polymer; dosage rate | Pour point |
|---|---|---|
| 9 (comp.) | — | 24° C. |
| 10 | P3; 500 ppm | 6 |
| 11 | P7; 500 ppm | 6 |
| 12 | P8; 500 ppm | 12 |
| 13 | P6; 500 ppm | 9 |
| 14 (comp.) | P14; 500 ppm | 12 |

TABLE 6

Pour point depression in test oil C

| Example | Polymer; dosage rate | Pour point |
|---|---|---|
| 15 (comp.) | — | 27° C. |
| 16 | P3; 1200 ppm | 9 |
| 17 | P6; 1200 ppm | 12 |
| 18 | P7; 1200 ppm | 9 |
| 19 (comp.) | P13; 1200 ppm | 18 |
| 20 | P19; 1200 ppm | 9 |
| 21 (comp.) | P14; 1200 ppm | 12 |

TABLE 7

Pour point depression in test oil D

| Example | Polymer; dosage rate | Pour point |
|---|---|---|
| 22 (comp.) | — | 27° C. |
| 23 | P15; 1200 ppm | 9 |
| 24 | P16; 1200 ppm | 12 |
| 25 (comp.) | P17; 1200 ppm | 15 |

TABLE 8

Pour point depression in test oil E

| Example | Polymer; dosage rate | Pour point |
|---|---|---|
| 26 (comp.) | — | 30 |
| 27 | P18; | 12 |
| 28 | P19; | 12 |
| 29 | P20; | 15 |
| 30 (comp.) | P21; 1000 ppm | 18 |
| 31 (comp.) | P11; 1000 ppm | 21 |

The short-chain or branched alkyl acrylates of WO 2014/095412 that are proposed in a similar context likewise lower the intrinsic pour point of the additives, but, on account of their chemical structure, are incapable of interacting with the constituents that precipitate out of the additized oil and hence attenuate the efficacy of the additives to a greater degree than is the case with the comonomers that bear an aromatic radical.

The invention claimed is:

1. A polymer composition obtainable by free-radical polymerization of
   A) 95-40% by weight of a monomer mixture containing
      Ai) 65-98% by weight of an alkyl (meth)acrylate having a linear $C_{16}$-$C_{40}$-alkyl radical and
      Aii) 2-35% by weight of at least one comonomer of the general formula (2),

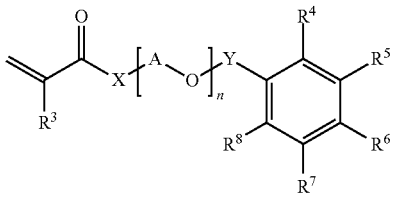

(2)

wherein

R³ is hydrogen or methyl,

R⁴, R⁵, R⁶, R⁷ and R⁸ are independently hydrogen, a $C_1$-$C_{20}$-alkyl radical, a $C_1$-$C_4$-alkylaryl radical, an oxy-$C_1$-$C_6$-alkyl radical or a cyano, nitro, halogen or sulfonate group, X is oxygen or NR⁹, A is an alkylene radical having 2 to 6 carbon atoms, n is 0 or an integer from 1 to 10, with the proviso that, when n=1, Y is not a single bond between the aromatic system and the oxygen of the oxyalkylene group, Y is an alkylene group having 1 to 10 carbon atoms, an alkenylene group having 3 to 10 carbon atoms, a carbonyl group, a group of the formula —C(=O)—R¹⁰—, a single bond between the aromatic system and the oxygen of the oxyalkylene group or of the polyoxyalkylene group or, when n is 0, is a single bond between the aromatic system and X, R⁹ is hydrogen or a $C_1$-$C_{20}$-alkyl radical and R¹⁰ is a single bond, an alkylene group having 1 to 6 carbon atoms or an alkenylene group having 3 to 6 carbon atoms, in the presence of B) 5-60% by weight of at least one ethylene copolymer.

2. The polymer composition as claimed in claim 1, wherein the comonomer Aii has the general formula 2a

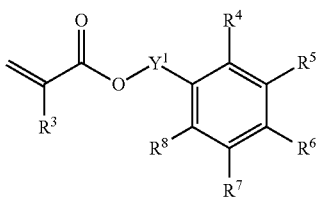

(2a)

in which

R³ is hydrogen or methyl,

R⁴, R⁵, R⁶, R⁷ and R⁸ are independently hydrogen, a $C_1$-$C_{20}$-alkyl radical, an alkylaryl radical, an oxy-$C_1$-$C_6$-alkyl radical or a cyano, nitro, halogen or sulfonate group, Y¹ is an alkylene group having 1 to 10 carbon atoms or an alkenylene group having 3 to 10 carbon atoms.

3. The polymer composition as claimed in claim 1, wherein the comonomer Aii has the general formula 2b

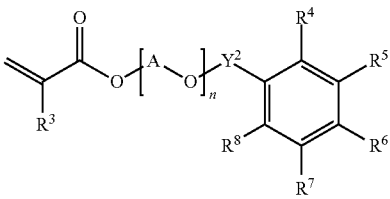

(2b)

in which

R³ is hydrogen or methyl,

R⁴, R⁵, R⁶, R⁷ and R⁸ are independently hydrogen, a $C_1$-$C_{20}$-alkyl radical, an alkylaryl radical, an oxy-$C_1$-$C_6$-alkyl radical or a cyano, nitro, halogen or sulfonate group, A is an alkylene radical having 2 to 6 carbon atoms, n is an integer from 2 to 10 and Y² is a single bond between the aromatic system and the oxygen of the polyoxyalkylene group, or is an alkylene group having 1 to 10 carbon atoms or an alkenylene group having 3 to 10 carbon atoms.

4. The polymer composition as claimed in claim 1, wherein the comonomer Aii has the general formula 2c

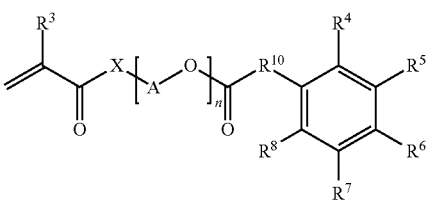

(2c)

in which

R³ is hydrogen or methyl,

R⁴, R⁵, R⁶, R⁷ and R⁸ are independently hydrogen, a $C_1$-$C_{20}$-alkyl radical, a $C_1$-$C_4$-alkylaryl radical, an oxy-$C_1$-$C_6$-alkyl radical or a cyano, nitro, halogen or sulfonate group, X is oxygen or NR⁹, A is an alkylene radical having 2 to 6 carbon atoms, n is an integer from 1 to 10, Y is an alkylene group having 1 to 10 carbon atoms, an alkenylene group having 3 to 10 carbon atoms, a carbonyl group, a group of the formula —C(=O)—R¹⁰—, a single bond between the aromatic system and the oxygen of the oxyalkylene group or of the polyoxyalkylene group or, when n is 0, is a single bond between the aromatic system and X, R⁹ is hydrogen or a $C_1$-$C_{20}$-alkyl radical and R¹⁰ is a single bond, an alkylene group having 1 to 6 carbon atoms or an alkenylene group having 3 to 6 carbon atoms.

5. The polymer composition as claimed in claim 1, wherein the comonomer Aii is the ester of acrylic acid or methacrylic acid with an aromatic compound that bears a hydroxyl group and is of the formula (3)

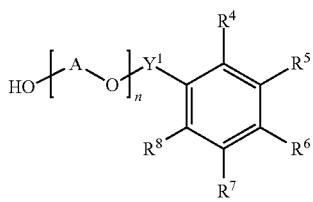   (3)

in which
R$^4$, R$^5$, R$^6$, R$^7$ and R$^8$ are independently hydrogen, a C$_1$-C$_{20}$-alkyl radical, a C$_1$-C$_4$-alkylaryl radical, an oxy-C$_1$-C$_6$-alkyl radical or a cyano, nitro, halogen or sulfonate group,
A is an alkylene radical having 2 to 6 carbon atoms,
n is an integer from 1 to 10, with the proviso that, when n=1, Y is not a single bond between the aromatic system and the oxygen of the oxyalkylene group,
Y is an alkylene group having 1 to 10 carbon atoms, an alkenylene group having 3 to 10 carbon atoms, a carbonyl group, a group of the formula —C(=O)—R$^{10}$—, a single bond between the aromatic system and the oxygen of the oxyalkylene group or of the polyoxyalkylene group or, when n is 0, is a single bond between the aromatic system and X.

6. The polymer composition as claimed in claim 1, wherein the alkyl (meth)acrylate Ai has the general formula (1)

$$H_2C=C(R^1)-COOR^2 \quad (1)$$

where
R$^1$ is H or a methyl group, and preferably H, and
R$^2$ is a linear alkyl radical having 16 to 40 carbon atoms, preferably having 18 to 26 carbon atoms.

7. The polymer composition as claimed in claim 1, wherein the monomer Ai is an ester of acrylic acid.

8. The polymer composition as claimed in claim 1, wherein the monomer mixture A) contains 65% to 98% by weight, of at least one alkyl (meth)acrylate Ai, based on the total weight of A).

9. The polymer composition as claimed in claim 1, wherein the monomer mixture A) contains 2% to 35% by weight, of at least one comonomer Aii, based on the total weight of A).

10. The polymer composition as claimed in claim 1 wherein the monomer mixture A) contains up to 20% by weight of one or more further monomers Aiii.

11. The polymer composition as claimed in claim 10, wherein Aiii is selected from the group consisting of ethylenically unsaturated esters of the formulae (4) and (5)

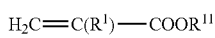   (4)

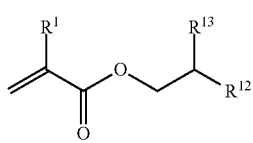   (5)

where
R$^1$ is hydrogen or methyl,
R$^{11}$ is a linear alkyl radical having 1 to 11 carbon atoms, is a branched alkyl radical having 4 to 17 carbon atoms or is a cyclic alkyl radical having 5 to 20 carbon atoms and
R$^{12}$ and R$^{13}$ are independently a saturated linear alkyl radical having 6 to 20 carbon atoms and the sum total of the carbon atoms in R$^{12}$ and R$^{13}$ is between 16 and 40.

12. The polymer composition as claimed in claim 10, wherein Aiii is selected from the group consisting of
a) vinyl esters of carboxylic acids having 1 to 20 carbon atoms,
b) α-olefins having 6 to 40 carbon atoms,
c) vinylaromatics,
d) ethylenically unsaturated dicarboxylic acids and the anhydrides and esters thereof with C$_{10}$-C$_{30}$ fatty alcohols,
e) acrylic acid,
f) methacrylic acid, and
g) further ethylenically unsaturated compounds bearing functional groups.

13. The polymer composition as claimed in claim 1, wherein the ethylene copolymer B), aside from ethylene, contains 4 to 18 mol % of at least one vinyl ester, acrylic ester, methacrylic ester, alkyl vinyl ether, alkene, or combinations thereof.

14. The polymer composition as claimed in claim 1, wherein the ethylene copolymer B) is a copolymer of ethylene and the vinyl ester of a C$_1$-C$_{24}$ carboxylic acid, a C$_1$-C$_{22}$-alkyl (meth)acrylate and a C$_3$-C$_{24}$ olefin.

15. The polymer composition as claimed in claim 1, wherein the ethylene copolymer B) is a copolymer of ethylene and at least one vinyl ester of the formula (5)

$$CH_2=CH-OCOR^{14} \quad (5)$$

in which R$^{14}$ is C$_1$- to C$_{30}$-alkyl.

16. The polymer composition as claimed in claim 1, wherein the ethylene copolymer B) contains vinyl acetate as comonomer.

17. The polymer composition as claimed in claim 1, wherein the ethylene copolymer B) is a copolymer of ethylene and at least one acrylic ester or methacrylic ester of the formula (6)

$$CH_2=CR^{15}-COOR^{16} \quad (6)$$

in which
R$^{15}$ is hydrogen or methyl, and
R$^{16}$ is C$_1$- to C$_{30}$-alkyl.

18. The polymer composition as claimed in claim 1, wherein the ethylene copolymer B) has an MFI190 value measured to DIN 53735 at 190° C. and an applied weight of 2.16 kg of between 0.1 and 1200 g/10 min.

19. A method of lowering the intrinsic pour point of polymer compositions by free-radically polymerizing
A) 95-40% by weight of a monomer mixture containing at least one alkyl (meth)acrylate having a linear C$_{16}$-C$_{40}$-alkyl radical in an amount of 65-98% by weight, based on the total weight of the monomer mixture A), in the presence of
B) 5-60% by weight of at least one ethylene copolymer, wherein 2% to 35% by weight, based on the total weight of monomer mixture A), of at least one comonomer Aii of the general formula (2),

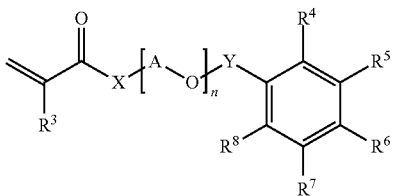

(2)

wherein
$R^3$ is hydrogen or methyl,
$R^4$, $R^5$, $R^6$, $R^7$ and $R^8$ are independently hydrogen, a $C_1$-$C_{20}$-alkyl radical, a $C_1$-$C_4$-alkylaryl radical, an oxy-$C_1$-$C_6$-alkyl radical or a cyano, nitro, halogen or sulfonate group,
X is oxygen or $NR^9$,
A is an alkylene radical having 2 to 6 carbon atoms,
n is 0 or an integer from 1 to 10, with the proviso that, when n=1, Y is not a single bond between the aromatic system and the oxygen of the oxyalkylene group,
Y is an alkylene group having 1 to 10 carbon atoms, an alkenylene group having 3 to 10 carbon atoms, a carbonyl group, a group of the formula —C(=O)—$R^{10}$—, a single bond between the aromatic system and the oxygen of the oxyalkylene group or of the polyoxyalkylene group or, when n is 0, is a single bond between the aromatic system and X,
$R^9$ is hydrogen or a $C_1$-$C_{20}$-alkyl radical and
$R^{10}$ is a single bond, an alkylene group having 1 to 6 carbon atoms or an alkenylene group having 3 to 6 carbon atoms,
is added to monomer mixture A) prior to the free-radical polymerization.

20. A process for producing polymer compositions as claimed in claim 1 by polymerizing
A) 95-40% by weight of a monomer mixture containing
Ai) 65-98% by weight of at least alkyl (meth)acrylate having a linear $C_{16}$-$C_{40}$-alkyl radical and
Aii) 2-35% by weight of at least one comonomer of the general formula (2),

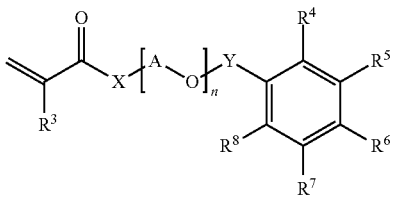

(2)

wherein
$R^3$ is hydrogen or methyl,
$R^4$, $R^5$, $R^6$, $R^7$ and $R^8$ are independently hydrogen, a $C_1$-$C_{20}$-alkyl radical, a $C_1$-$C_4$-alkylaryl radical, an oxy-$C_1$-$C_6$-alkyl radical or a cyano, nitro, halogen or sulfonate group,
X is oxygen or $NR^9$,
A is an alkylene radical having 2 to 6 carbon atoms,
n is 0 or an integer from 1 to 10, with the proviso that, when n=1, Y is not a single bond between the aromatic system and the oxygen of the oxyalkylene group,
Y is an alkylene group having 1 to 10 carbon atoms, an alkenylene group having 3 to 10 carbon atoms, a carbonyl group, a group of the formula —C(=O)—$R^{10}$—, a single bond between the aromatic system and the oxygen of the oxyalkylene group or of the polyoxyalkylene group or, when n is 0, is a single bond between the aromatic system and X,
$R^9$ is hydrogen or a $C_1$-$C_{20}$-alkyl radical and
$R^{10}$ is a single bond, an alkylene group having 1 to 6 carbon atoms or an alkenylene group having 3 to 6 carbon atoms,
in the presence of
B) 5-60% by weight of at least one ethylene copolymer and, optionally, an organic solvent, by adding a free-radical chain initiator.

21. The process as claimed in claim 20, in which the polymerization is conducted in the presence of 0.1 to 10 times the weight of solvent, based on the weight of A) and B).

22. The process as claimed in claim 20, in which the solvent is an aliphatic hydrocarbon or an aliphatic hydrocarbon mixture having a flashpoint of at least 60° C.

23. A concentrated polymer composition comprising
I) a polymer composition as claimed in claim 1, and
II) an organic solvent (C).

24. The concentrated polymer composition as claimed in claim 23, comprising 10% to 80% by weight of the polymer composition as claimed in claim 1, and 90% to 20% by weight of organic solvent.

25. The concentrated polymer composition as claimed in claim 23, wherein the organic solvent is a mixture of aliphatic and aromatic hydrocarbons.

26. The concentrated polymer composition as claimed in claim 23, wherein the organic solvent contains at least 20% by weight of aromatic hydrocarbons.

27. A paraffinic hydrocarbon oil having improved cold properties, comprising a polymer composition as claimed in claim 1.

28. D) A method for lowering the intrinsic pour point of polymer compositions that are the product of a polymerization of alkyl (meth)acrylates Ai) in the presence of ethylene copolymers B), wherein Aii) is used in an amount of 2% to 35% by weight, based on the total weight of the monomer mixture of Ai) and Aii), together with 65-98% by weight of Ai) in a free-radical polymerization of
A) 95-40% by weight of the monomer mixture of Ai) and Aii), in the presence of
B) 5-60% by weight of at least one ethylene copolymer, and
wherein
Ai) contains at least one alkyl (meth)acrylate having a linear $C_{16}$-$C_{40}$-alkyl radical, and
Aii) is at least one comonomer of the general formula (2),

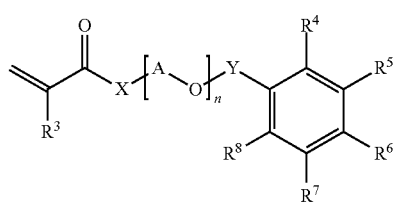

(2)

wherein

R³ is hydrogen or methyl,

R⁴, R⁵, R⁶, R⁷ and R⁸ are independently hydrogen, a $C_1$-$C_{20}$-alkyl radical, a $C_1$-$C_4$-alkylaryl radical, an oxy-$C_1$-$C_6$-alkyl radical or a cyano, nitro, halogen or sulfonate group, X is oxygen or NR⁹, A is an alkylene radical having 2 to 6 carbon atoms, n is 0 or an integer from 1 to 10, with the proviso that, when n=1, Y is not a single bond between the aromatic system and the oxygen of the oxyalkylene group, Y is an alkylene group having 1 to 10 carbon atoms, an alkenylene group having 3 to 10 carbon atoms, a carbonyl group, a group of the formula —C(=O)—R¹⁰—, a single bond between the aromatic system and the oxygen of the oxyalkylene group or of the polyoxyalkylene group or, when n is 0, is a single bond between the aromatic system and X, R⁹ is hydrogen or a $C_1$-$C_{20}$-alkyl radical and R¹⁰ is a single bond, an alkylene group having 1 to 6 carbon atoms or an alkenylene group having 3 to 6 carbon atoms.

* * * * *

UNITED STATES PATENT AND TRADEMARK OFFICE
CERTIFICATE OF CORRECTION

| | | |
|---|---|---|
| PATENT NO. | : 12,060,480 B2 | Page 1 of 1 |
| APPLICATION NO. | : 17/764111 | |
| DATED | : August 13, 2024 | |
| INVENTOR(S) | : Michael Feustel et al. | |

It is certified that error appears in the above-identified patent and that said Letters Patent is hereby corrected as shown below:

On the Title Page

Column 1, Inventors item (72):
Line 9 delete "Saul" and insert --Sahl--

Signed and Sealed this
Thirteenth Day of January, 2026

John A. Squires
*Director of the United States Patent and Trademark Office*